United States Patent Office 3,575,961
Patented Apr. 20, 1971

3,575,961
POLYFLUOROALKYLAZIRIDINES AND
THEIR PRODUCTION
Giuliana C. Tesoro, Dobbs Ferry, N.Y., and Richard
Ring, Woodridge, N.J., assignors to J. P. Stevens &
Co., Inc., New York, N.Y.
No Drawing. Filed Mar. 9, 1962, Ser. No. 178,572
Int. Cl. C07d 23/02, 23/06
U.S. Cl. 260—239
6 Claims

ABSTRACT OF THE DISCLOSURE

Fluorinated aziridine compounds are disclosed which are the addition or substitution products of the reaction of an ethyleneimine and fluorine-containing compound. One or two aziridine groups may be present in the compounds which are useful for the chemical modification of textile materials.

---

This invention relates to novel cyclic imines and methods for their preparation. More particularly, the present invention is directed to certain fluorinated aziridines which have been found to be particularly adapted for use in a wide variety of applications as intermediates for chemical synthesis, as reagents for polymer modifications, as monomers and comonomers in polymerization reactions. They contain the fluorinated grouping, and therefore can impart highly desirable physico-chemical properties to surfaces treated with them; the presence of the highly reactive aziridine grouping imparts chemical reactivity to the compounds, so that the desirable fluorinated residue can be attached by chemical bonds to suitable surfaces. For example, in the case of polymers containing active hydrogen atoms, the reaction shown in the following equation, takes place

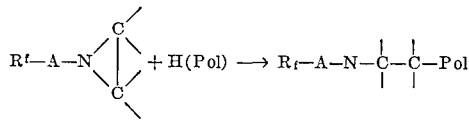

and the polymer (e.g. cellulose) acquires oil repellent and water repellent properties due to the presence of the fluorinated groupings.

Specifically, the invention provides novel and useful fluorinated aziridines containing an aziridine moiety connected through the nitrogen atom thereof to a organofluorine moiety derived from the group consisting of fluorinated olefins, fluorinated diolefins, fluorinated halocarbons, fluorinated aldehydes, fluorinated epoxides and fluorinated acid halides, said organofluorine moiety being free of elements other than carbon, hydrogen, oxygen in hydroxyl, ether, ester and carbonyl forms only, sulfur in thioether, sulfoxide and sulfone forms only and halogen.

The compounds of the invention are the addition or substitution products of the reaction of an ethylene imine and a fluorine-containing compound and can be conveniently characterized by the formula:

(I)

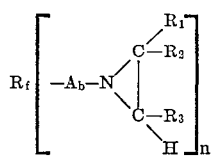

wherein $R_f$ represents aliphatic and alicyclic fluorine-containing radicals and has a valence equal to $n$; A represents a bivalent organic radical; $b$ has a value of 0–1; $R_1$, $R_2$ and $R_3$ represent hydrogen or lower alkyls and $n$ represents a whole positive integer in the range of 1 through 2.

One of the important embodiments of the invention within the scope of Formula I above is that embodiment wherein $b$ is equal to zero (0), and the fluorinated residue, $R_f$, is directly attached to the aziridine ring:

(II)

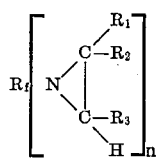

wherein $R_f$, $R_1$, $R_2$, $R_3$ and $n$ have the meanings as set forth supra.

One modification of this embodiment of the invention includes types of fluorinated aziridines of Formula II above, $m$ is a positive integer with a value of 0 to 2, and olefins in accordance with the equation:

(1)

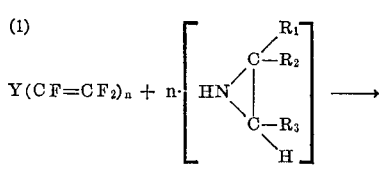

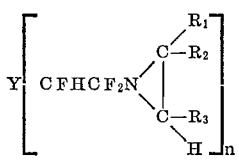

wherein $R_1$, $R_2$ and $R_3$ and $n$ have the same meanings as defined above and Y represents an organic radical, the valence of which is equal to $n$.

A further modification of the embodiment of the invention defined by Formula II above are types of compounds characterized by the formula:

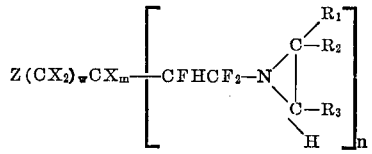

wherein $R_1$, $R_2$, $R_3$ and $n$ have the same meanings as above $m$ is a positive integer with a value of 0 to 2, and X represents hydrogen, chlorine or fluorine and $w$ is a whole number in the range of from 0 through 18, and Z represents hydrogen, chlorine, fluorine or

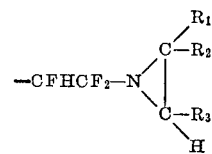

Another important embodiment of the invention within the scope of Formula I above are compounds wherein the group $R_f$ of Formula I is part of a cyclic structure:

(III)

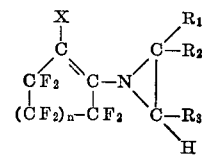

in which $R_1$, $R_2$ and $R_3$ have the meaning defined above, $n$ has a value of 1 or 2 and X represents hydrogen or chlorine obtained by the reaction of a suitable cyclic fluorinated compound with an imine in accordance, for example, with the following equation:

(2) 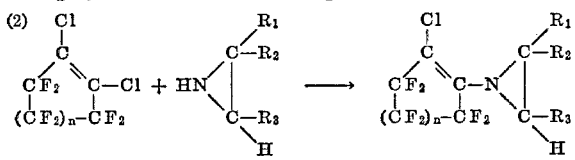

Still another important embodiment of the invention within the scope of Formula I above, are compounds in which $R_f$ is attached to the aziridine radical by means of a bivalent organic radical of such structure that the nitrogen atom of the aziridine radical is a tertiary amino nitrogen:

(IV) 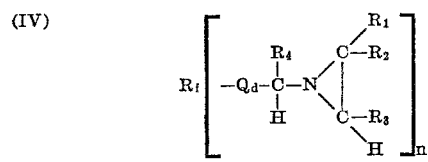

wherein $R_1$, $R_2$, $R_3$ and $n$ have the meaning defined above, $d$ has a value of 0 to 1, $R_4$ represents hydrogen, lower alkyl or hydroxyl and Q is a divalent organic grouping.

One modification of the embodiment of the invention defined by Formula IV above, are those compounds prepared by the reaction of fluorinated aldehydes and an imine in accordance with the equation:

(3) 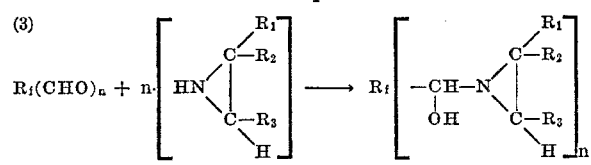

Another modification of the embodiment of the invention defined by Formula IV above, are those compounds prepared by the reaction of fluorinated epoxides and an imine in accordance with the following equation:

(4) 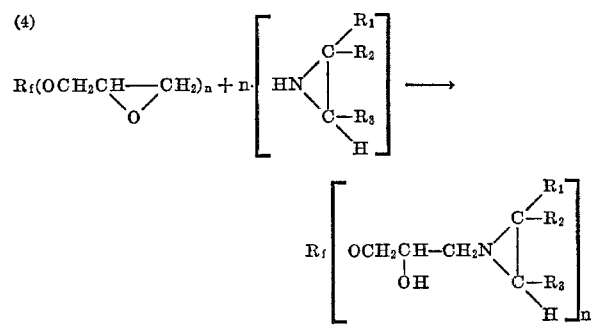

Still another modification of the embodiment of the invention defined by Formula IV above, includes compounds prepared by the reaction of an imine with unsaturated esters and ethers of fluorinated alcohols as shown by way of example in Equation 5 and 6 respectively:

(5) 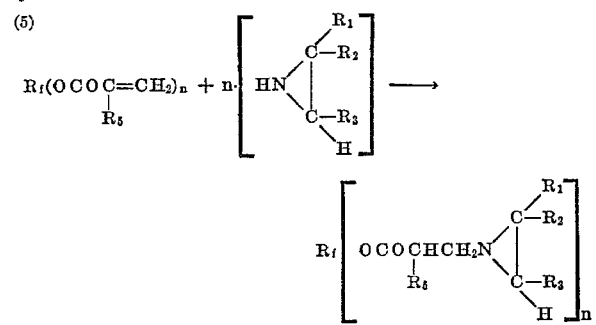

wherein $R_5$ is hydrogen or lower alkyl.

(6) 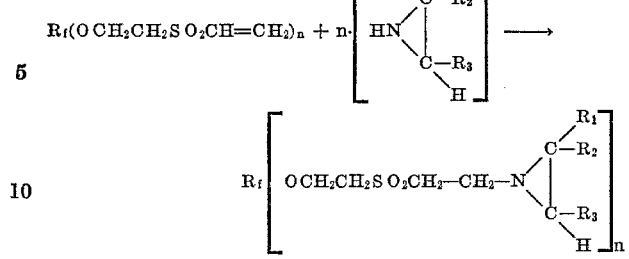

A further modification of the embodiment of the invention defined by Formula IV above, includes compounds prepared by the reaction of an imine with halogenated ethers and esters of fluorinated alcohols in accordance with Equations 7 and 8 respectively:

(7) 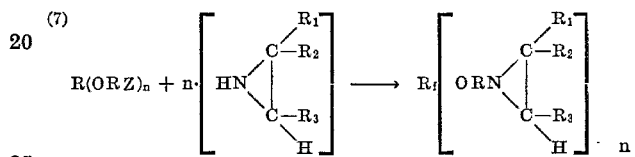

(8) 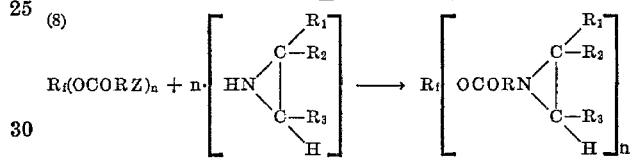

wherein R is an alkylene radical and Z is chlorine, bromine or iodine.

A further important embodiment of the invention within the scope of Formula I above, are compounds wherein the $R_f$ is attached to the aziridine radical by means of an organic radical of such structure that a carboxy amide linkage is formed with the nitrogen atom of the aziridine group:

(V) 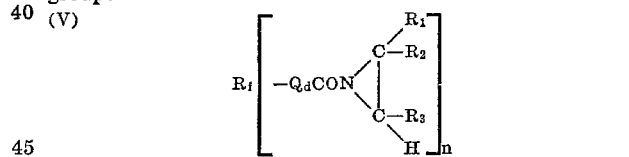

A modification of the embodiment of the invention defined by Formula V above, includes compounds prepared by the reaction of fluorinated acid halides and imines in accordance with Equations 9, 10, and 11:

(9) 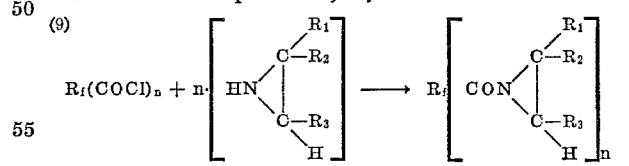

(10) 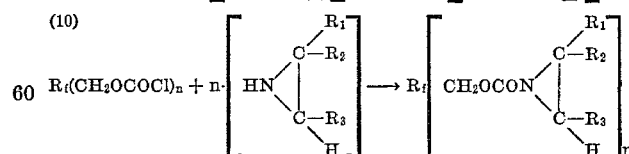

(11) 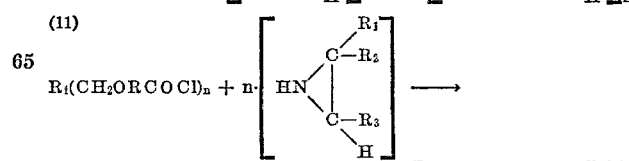

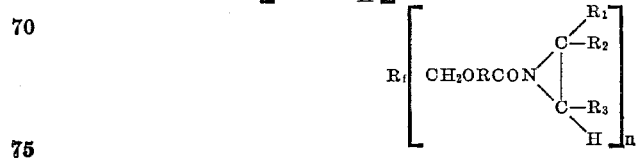

The methods of the invention depend primarily upon the structure of the product desired for, as evident from the above, the production of certain classes of products involve an addition reaction of the imine and a fluoro-olefin, for example, whereas others involve a substitution reaction between imine and a compound such as a fluorinated acid chloride.

In any event, the reactions between the imine and fluorinated compound are best carried out at atmospheric pressures although this is not necessarily critical.

The temperature for the reaction between the imine and the fluorinated compound is not narrowly critical. Temperatures ranging from —20° C. to about 60° C. can be used with moderate temperatures in the range of from about 0° C. to 35° C. being preferred.

The reaction can be carried out in the presence of a solvent if desired. If a solvent is employed, care must be exercised in selecting a solvent which will not react with the imine. Thus, inert solvents, such as aliphatic ethers including diethyl ether, ethylene glycol dimethyl ether, dioxane and the like, are suitable as solvents.

Care must also be exercised in employing acid acceptors in those reactions which generate acidic by-products as imines tend to polymerize rapidly in the presence of hydrogen ion thus affecting yield.

The reaction period is usually accomplished in a time varying from about thirty minutes to several hours at the above-described temperatures and pressures.

The mol ratios of reactants employed will vary considerably depending upon the structure of the products desired. Generally speaking, for monofunctional fluorinated compounds, a stoichiometric amount of the imine reagent should be employed, and a molar excess is often advantageous. On the other hand, when it is desired to react only one functional group of a polyfunctional fluorinated compound, the fluorinated reagent should be present in excess in order to avoid the formation of polyfunctional derivatives.

In carrying out the methods of the invention, the general procedure involves the addition of a solution of an imine in an inert solvent to a fluorinated organic compound with stirring over a period of about thirty minutes while maintaining the temperature at about 20 to 35° C. with cooling, if necessary. Stirring of the reaction mixture in continued as desired whereupon the reaction mixture is stored overnight or several days, then filtered, solvent removed and purified and recovered as by crystallization or any other convenient means.

Illustrative of the fluorinated compounds which are operable as starting materials in the methods of the invention are:

Fluorinated olefins

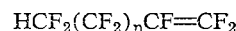
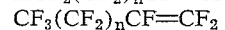
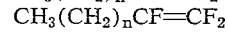

where $n=1$ to 11

Preparative methods for these compounds are described, for example, in Lovelace—Aliphatic Flourine Compounds—(Reinhold, 1958), p. 107; in the J. Am. Chem. Soc. 75, 4525 (1953); in U.S.P. 2,296,203 and in other publications. Other fluorinated olefins which are operable are those represented by the formula:

$$C_nH_{2n+1}SCF=CFCF_3$$

and described in U.S.P. 2,864,867.

Fluorinated diolefins represented by a formula $CF_2=CF(CF_2)_nCF=CF_2$ are suitable for the preparation of polyfunctional aziridine compounds and have been reported in the J. Am. Chem. Soc. 79, 4171 (1957) and in U.S.P. 2,833,831.

Fluorinated halocarbons

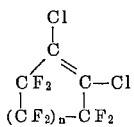

and $ClCFCF_2CF_2CFCH_2CH_2Br$ (see U.S. Pat. 2,922,823).

Fluorinated aldehydes $HCF_2(CF_2)_nCHO$, $CF_3(CF_2)_nCHO$. See J. Am. Chem. Soc. 76, 300 (1954) and 77, 917 (1955) for preparative methods.

Fluorinated epoxides

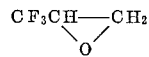

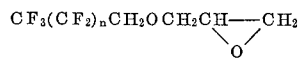

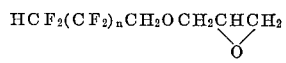

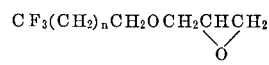

See J. Am. Chem. Soc. 74, 3902 (1952), 75, 1609 (1953).

Fluorinated esters $$CF_3(CF_2)_nCH_2OCOCH=CH_2$$

$$HCF_2(CF_2)_nCH_2OCOCH_2CH_2Cl$$

and others such as described in U.S.P. 2,839,513.

Fluorinated ethers

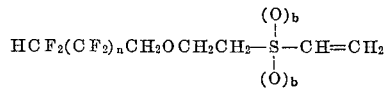

where $b$ is 0 to 1

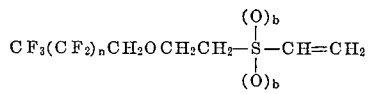

Fluorinated acid chlorides $Cl(CF_2CFCl)_nCF_2COCl$ $HCF_2(CF_2)_nCF_2COCl$ $CF_3(CF_2)_nCF_2COCl$ and others such as described in U.S. Pat. 2,908,710 $[S(CH[C_nF_{2n+1}]CH_2COCl)_2]$ and in U.S. Pat. 2,959,611 $(X(CF_2)_nCH_2OCOCl)$.

The following examples will serve to merely illustrate the practice of the invention and are not to be considered limitative thereof.

EXAMPLE 1

Preparation of 10H-nonadecafluorodecene-1

$$H(CH_2)_8CF=CF_2$$

A 28.5 gram (0.049 mole) charge of the potassium salt of 11H-eiscosafluoro-1-undecanoic acid was placed in a distillation flask attached to a distillation set-up. A bubble counter was attached to the system to measure the carbon dioxide evolved. The salt was heated until a slow evolution of carbon dioxide began, and this was maintained by slowly raising the temperature. The desired olefin began to distill when the still pot temperature reached 230° and when the temperature reached 290° C. no additional distillate or carbon dioxide was produced. The salt was cooled and broken up, the process was repeated. A total distillate of 20.6 grams was obtained (88% of theory). The product was redistilled and 17.3 grams (74% of theory) of distillate, B.P. 146°–150° C. was obtained.

EXAMPLE 2

Preparation of N-(2H, 10H-nonadecafluoro-1-decyl)-ethylene imine

A solution of 8.6 grams (0.20 mole) of ethylene imine in 30 ml. of ether was slowly added to a stirred mixture of 47.9 grams (0.0995 mole) of 10H-nonadecafluorodecene-1 (the product of Example 1), 13.8 grams (0.10 mole) of potassium carbonate and 500 ml. of ether over a period of 30 minutes. The temperature remained at 25–27° during the addition without external cooling. The mixture was filtered and the filtrate was evaporated to yield 45.3 grams of liquid residue which was not basic enough to be titrated with hydrochloric acid, or with perchloric acid in dioxane. This was distilled to yield 24.5 grams (46.8% of theory) of product, B.P. 80–82°/4.0 mm. The elemental analysis of this product is shown in the table below:

|  | Percent C | Percent N | Percent F |
| --- | --- | --- | --- |
| Found | 28.63 | 3.30 | 67.17 |
| Calcd. for $C_{12}H_6F_{19}N$ | 27.4 | 2.67 | 68.74 |
| Calcd. for $C_{10}H_6F_{15}N$ | 28.24 | 3.30 | 67.01 | and indicates that tetrafluoroethylene may have been lost either during the pyrolysis of the carboxylic acid (Example 1) or during the imine reaction, forming the following compound:

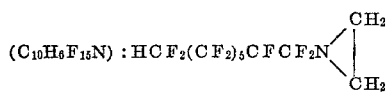

as the main reaction product instead of the expected compound:

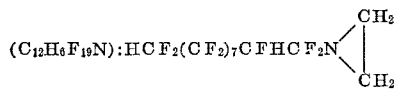

EXAMPLE 3

Preparation of perfluoroheptene-1

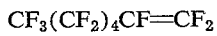

Perfluoroheptanoic acid was converted to the potassium salt by addition of an equivalent amount of 2 N potassium hydroxide in methanol and evaporation of the solvent.

Potassium perfluoroheptanoate (33.9 grams, 0.075 mole) was slowly heated in a distillation set-up with a bubble counter attached to indicate the rate of carbon dioxide evolution and with the receiver cooled in an acetone-dry ice bath. When the temperature reached 161°, the first signs of distillation and carbon dioxide evolution were observed. The temperature was raised slowly to 250° C. where carbon dioxide evolution become very slow. A distillate of 19.1 grams (72.8% of theory) was obtained during this period. The residue was cooled, the solid was broken up and the process was repeated, this time heating to 324° C. An additional 6.3 grams of distillate was obtained bringing the total yield to 25.4 grams (96.6% of theory). The combined product was redistilled to give the following fractions: (1) 2.7 grams, B.P. 73–77°; (2) 18.7 grams, B.P. 78–80°; (3) 1.3 grams, B.P. 80–83°. The boiling point of perfluoroheptene-1 as given in the literature was 81° (R. N. Haszeldine, J. Chem. Soc., 1952, 4259; J. D. LaZerte, L. J. Hals et al., J. Am. Chem. Soc., 75, 4525 (1953)).

EXAMPLE 4

Preparation of N-(2H-tetradecafluoroheptyl) ethylene imine

A solution of 8.6 grams (0.20 mole) of ethylene imine in 35 ml. of ether was slowly added to a stirred mixture of 35.0 grams (0.10 mole) of perfluoroheptene-1 (product of Example 3) and 13.8 grams (0.10 mole) of anhydrous potassium carbonate in 350 ml. of ether during a period of one hour. A temperature of 23–25° was maintained by cooling with an ice bath. The mixture was allowed to stand for two days and then was filtered and concentrated in vacuo to yield 35.7 grams of residue which contained both liquid and solid. The solid was insoluble in water and organic solvents, including dimethylformamide and therefore was assumed to be polymerized material. The mixture was filtered to give 12.8 grams of liquid filtrate which was distilled to yield 15.6 grams of product (40% of theory), B.P. 76–81°/60 mm.

EXAMPLE 5

Preparation of 1-chloro-2-(1-aziridinyl)hexafluorocyclopentene-1

Ethylene imine (21.5 grams, 0.50 mole) was added slowly with stirring to a mixture of 122.5 grams (0.50 mole) of 1,2-dichlorohexafluorocyclopentene-1, 138.2 grams (1.00 mole) of anhydrous potassium carbonate and 500 ml. of 1,2-dimethoxyethane (Ansul 121) over a period of thirty minutes while maintaining a temperature of 12–16°. This mixture was stirred for three hours at room tempertaure and allowed to stand overnight. Analysis of a sample of the well-stirred mixture for ionic chloride indicated that 98% reaction had been achieved. The mixture was filtered, the solvent was removed from the filtrate under reduced pressure, and the residue was distilled after adding a pellet of potassium hydroxide to give 98.8 grams of product (79% of theory). B.P. 80–81°/31 mm.

*Analysis.*—Calcd. for $C_7H_4F_6ClN$ (percent): N, 5.57; F, 45.31. Found (percent): N, 6.29; F, 44.82.

EXAMPLE 6

Preparation of 1-chloro-2-[1-(2-methyl)aziridinyl] hexafluorocyclopentene-1

2-methyl ethylene imine (28.6 grams, 0.50 mole) was added slowly to a stirred mixture of 122.49 grams (0.50 mole) of 1,2 - dichlorohexafluorocyclopentene - 1, 138.2 grams (1.00 mole) of anhydrous potassium carbonate and 500 ml. of 1,2-dimethoxyethane (Ansul 121) over a period of 40 minutes at 10–18° C. The mixture was stirred as the temperature was allowed to rise to 25°. After which the mixture was allowed to stand at room temperature overnight. It was then filtered and concentrated in vacuo. The 136.1 grams of liquid residue which remained was distilled over two pellets of potassium hydroxide to give 108.3 grams (82% of theory) of product, B.P. 83–85° at 32 mm.

EXAMPLE 7

Preparation of N-(1H,1-hydroxyheptafluorobutyl) ethylene imine

Ethylene imine (39.7 grams, 0.924 mole) was slowly added to a stirred mixture of 100.0 grams (0.462 mole) of heptafluorobutyraldehyde, 138.2 grams (1.00 mole) of anhydrous potassium carbonate and 400 ml. of ether over a period of 25 minutes while maintaining a temperature of 4–5° C. by external cooling. The mixture was stirred at this temperature for an hour and then the temperature was allowed to rise slowly to 25° C. The mixture was filtered to remove the potassium carbonate and the solvent was removed under reduced pressure without heating to yield 101.0 grams of a slightly viscous liquid residue. Potentiometric titration indicated a molecular weight of 204.

Nitrogen analysis of the product (6.65%), indicated a molecular weight of 211 which agrees well with the results of the potentiometric titration.

The crude product consisted of a mixture of 66% monoaziridine I and 35% diaziridine II.

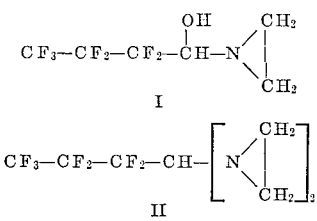

EXAMPLE 8

Preparation of 1-chloro - 3 - (1H,1H,7H - dodecafluoro-1-heptyloxy-2-propanol and 3-(1H,1H,7H-dodecafluoro-1-heptyloxy)-1,2-epoxy propane This intermediate was prepared by a modification of the method used by M. L. Bray and P. Tarrant (J. Am. Chem. Soc. 79, 6533 (1957)) to prepare similar chlorohydrins and epoxides from lower molecular weight fluoroalcohols.

1H,1H,7H-dodecafluoro-1-heptanol (216.0 grams, 0.65 mole) was slowly added to a stirred mixture of 120.0 grams (1.30 moles) of epichlorohydrin and 1.3 ml. of pyridine at 80 to 90° C. over a period of one hour. The mixture was heated at this temperature for an additional 13 hours and then distilled to yield the following fractions:

A 44.3 gram portion of distillate, B.P. 82–103°/5 mm. (fractions 1 and 2 above), which contain 41% (18.3 grams, 0.0431 mole) of 1-chloro-3-(1H,1H,7H-dodecafluoro-1-heptyloxy)-2-propanol and 58% (25.7 grams, 0.0662 mole) of 3-(1H,1H,7H-dodecafluoro-1-heptyloxy)-1,2-epoxypropane, was added slowly to 7 ml. of a stirred aqueous 27% solution of sodium hydroxide at 90° C. over a period of 30 minutes. The mixture was heated at this temperature for two additional hours. The reaction mixture was extracted with a mixture of benzene, ether and hexane and the extract was dried over sodium sulfate. Titration of the aqueous phase indicated that 90% of the theoretical chloride had been formed. After filtering, the solvent was stripped from the organic extract and distillation of the residue under reduced pressure yielded the following fractions:

(1) 22.0 grams, B.P. 102–104°/5 mm. and
(2) 6.17 grams, B.P. 104–110°/6 mm.

Analysis for epoxide content gave 92.5% for fraction 1 and 94.0% for fraction 2. The quantity of epoxide obtained is almost equal to the epoxide content charged. It thus appears that this procedure may have hydrolyzed the chlorohydrin to a glycol and thus facilitated separation of the epoxide.

| Fraction | Weight, g. | B.P. | Percent chlorohydrin | Percent epoxide |
|---|---|---|---|---|
| 1 | 12.4 | 82–94°/5 mm | 32.4 | 43.7 |
| 2 | 37.3 | 95–103°/5 mm | 44.1 | 62.8 |
| 3 | 26.9 | 105–111°/5 mm | 88.2 | 20.1 |
| 4 | 20.9 | 113–125°/5 mm | 98.7 | |

The chlorohydrin content was determined by analysis of the hydrolyzable chlorine using 1 N potassium hydroxide in ethylene glycol and determining the chloride ion using the method of Mohr. The epoxide content was determined using the pyridinium chloride pyridine method described by Mitchell, "Organic Analysis", vol. I, page 136.

EXAMPLE 9

Preparation of N-3-(1H,1H,7-H-dodecafluoro-1-heptyloxy)-2-hydroxypropyl ethylene imine Ethylene imine (5.10 grams, 0.119 mole) in 5 ml. of ether was added slowly to a stirred solution of 3-(1H,1H, 7H-dodecafluoro-1-heptyloxy) - 1,2 - epoxypropane (93% purity, 23.15 grams, 0.056 mole) in 25 ml. of ether over a period of 10 minutes at 7–12° C. The mixture was stirred for 3 hours at 15–20° C. and allowed to stand for two days at 25° C. The solvent and excess ethylene imine were stripped off under reduced pressure to yield 24.9 (97% of theory) of crude product as a viscous liquid. Nitrogen analysis (Found: 2.39, Calcd: 3.25) indicated a molecular weight of 585 (calc'd 431).

EXAMPLE 10

Preparation of 1H,1H,11H-eicosafluoro-1-undecylacrylate

A mixture of 399.1 grams (0.75 mole) of 1H,1H,11H,-eicosafluoro-1-undecanol, 46.8 grams (0.65 mole) of acrylic acid, 0.5 gram hydroquinone, ten dorps of concentrated sulfuric acid and 500 ml. of toluene were refluxed for 38 hours until 84% of the theoretical quantity of water had been collected in a Dean and Stark trap. The mixture was allowed to cool and a small amount of solid was removed by filtration. When the mixture was diluted with toluene, additional solid separated and was filtered off. The organic phase was washed with 1% sodium bicarbonate until the wash was neutral and the toluene solution was dried over anhydrous sodium sulfate. After filtration, the toluene solution was distilled and the following fractions were obtained:

| | G. |
|---|---|
| (1) B.P. 88–93°/1.6 mm. | 17.8 |
| (2) B.P. 94–98°/1.6–1.8 mm. | 117.9 |
| (3) B.P. 98–101°/1.7 mm. | 110.4 |
| (4) B.P. 102–107°/1.65 mm. | 27.4 |

The saponification equivalents of fractions 2 and 3 were determined by refluxing with potassium hydroxide in ethanol and were found to be 599 and 580 respectively. The theoretical equivalent weight is 586. Fractions 2 and 3 represent a 60% yield of purified product.

EXAMPLE 11

Preparation of 1H,1H,11H-eicosafluoro-1-undecyl 2-(1-aziridenyl)

Eight ml. (7.57 grams) of a 4.35 molar solution of sodium methoxide in methanol was added to a solution of 100.0 grams (0.17 mole) of 1H,1H,11H-eicosafluoro-1-undecyl acrylate (product of Example 10) in 50 ml. of chloroform. Ethylene imine (14.6 grams, 0.34 mole) was then added over a 5 minute period with stirring. The reaction was exothermic and the temperature rose from 30 to 41° C. The mixture was stirred for three hours and then heated four hours at 58–67°. The solid which separated was filtered off by gravity and the filtrate was concentrated under reduced pressure without heating. Potentiometric titration of the residue indicated an equivalent weight of 724 (theory 629).

Additional product of about the same purity was obtained by extracting the solids with chloroform and stripping off the solvent. A total of 91.8 grams of this crude material (85.8% of theory) was attained. Further purification could be accomplished by treatment with organic solvents.

EXAMPLE 12

Preparation of 1H,1H,9H-hexadecafluorononyl 2-(1-aziridinyl) propionate

This compound was prepared by a procedure similar to that described in Example 11 from ethylene imine and 1H,1H,9H-hexadecafluorononyl acrylate. The reaction temperature was maintained at 3–5° C., and the product obtained was purified by distillation. Yield 85%, B.P. 102–110° C./0.6 mm., percent N: Calc'd: 2.64%; Found: 2.91%.

EXAMPLE 13

Preparation of 1H,1H,7H-dodecafluoroheptyl 2-(1-aziridinyl) propionate

This compound was prepared from ethylene imine and 1H,1H,7H-dodecafluoroundecyl acrylate by the procedure outlined in Example 12. The product obtained was purified by distillation. Yield 88%, B.P. 78–92°C./0.4 mm. Equivalent weight determined by potentiometric titration: Calc'd: 429; Found: 460.

EXAMPLE 14

Preparation of 2-(1H,1H,11H-eicosafluoro-1-undecyloxy)-ethyl vinyl sulfone

A solution of 2 ml. of 4.36 molar sodium methoxide in methanol and 106.4 grams (0.20 mole) of 1H,1H,11H-eicosafluoro-1-undecanol in 100 ml. of 1,2-dimethoxyethane (Ansul 121) was slowly added with stirring to 236.4 grams (2.00 moles) of divinyl sulfone at 225°. When about half of the addition was complete, an additional 3.0 ml. of sodium methoxide solution was added to bring the pH of the mixture to 8. When the addition was completed, the temperature of the mixture was slowly raised to 90° over a five hour period. Sodium (0.6 gram, 0.026 mole) was then added and the mixture was refluxed for 10 hours. An additional 1.0 gram (0.045 mole) of sodium was added and the mixture was refluxed for 5 more hours. The reaction mixture was then neutralized with acetic acid and poured into a liter of water. The solid was separated by filtration, washed repeatedly with water and air dried. Recrystallization from carbon tetrachloride yielded a small amount of insoluble polymeric material and 103.1 grams (79.3% of theory) of the desired product, M.P. 76.0–79.0° C. An elemental analysis of 5.23% sulfur was obtained; calculated value for $C_{15}H_{10}F_{20}O_3S$ is 4.92% sulfur. The product was analyzed for unsaturation by dissolving 0.5 gram in 20 ml. of isopropanol, adding accurately 25 ml. of a 0.17 N solution of n-dodecyl mercaptan in isopropyl (99%) followed by addition of 2 ml. of 0.5 N potassium hydroxide in ethanol. The mixture was allowed to stand for one hour and then 125 ml. of 0.194 N hydrochloric acid in isopropanol was added. A blank was run concurrently. The amount of mercaptan consumed was determined by titration with 0.125 N bromate-iodide solution. This procedure indicated a molecular weight of 676 (theory 650).

EXAMPLE 15

The product of Example 14 is converted to the corresponding aziridine, 2 - (1H,1H,11H - eicosafluoro-1-undecyloxy)-ethyl-2-(1-aziridinyl)ethyl sulfone, by reaction with ethylene imine using the procedure of Example 11.

EXAMPLE 16

Preparation of 11H-eicosafluoro-1-undecanoyl chloride
$H(CF_2)_{10}COCl$

Thionyl chloride (26.8 grams, 0.227 mole) was slowly added to a mixture of 82.7 grams (0.151 mole) of 11H-eicosafluoro-1-undecanoic acid and 0.5 gram of pyridine and the resulting mixture was slowly heated to 107° C. Excess thionyl chloride was then removed under reduced pressure and the product was distilled to give 60.82 grams (71.5% yield) of white solid B.P. 109/110° 22 mm.

Analysis of this product for hydrolyzable chloride showed that 6.24% chlorine was present (calculated chlorine for $C_{11}HF_{20}Cl_0$ is 6.30%).

EXAMPLE 17

Preparation of N-(11H-eicosafluoro-1-undecanoyl) ethylene imine

11H - eicosafluoro-1-undecanoyl chloride (59.7 grams, 0.106 mole) in 50 ml. of 1,2-dimethoxyethane (Ansul 121) was added dropwise with stirring to a cooled solution of 4.78 grams (0.110 mole) of ethylene imine and 11.2 grams (0.110 mole) of triethyl amine in 200 ml. of 1,2-dimethoxyethane. The temperature was maintained at −5 to +4° during the half hour required for the addition, and was then allowed to rise slowly to room temperature. The mixture was filtered to remove the triethylamine hydrochloride and the filtrate was concentrated in vacuo without heating. Analysis of the triethylamine hydrochloride indicated 72% conversion. A residue of 67.3 grams (112% of theory) of tan solid remained. This was dissolved in ethyl acetate and precipitated by slow addition of benzene to the stirred solution. The light brown solid which precipitated was filtered off and air dried to give 46.3 grams (76% yield) of purified product, M.P. 92.0–93.5° C.

EXAMPLE 18

Preparation of N-(11H-eicosafluoro-1-undecanoyl)2,2-dimethyl ethylene imine

A solution of 237.1 grams (0.434 mole) of 11H-eicosafluoro-1-undecanoyl chloride in 250 ml. of 1,2-dimethylethylene glycol (Ansul 121) was slowly added to a well stirred solution of 24.4 grams (0.568 mole) of 2,2-dimethyl ethylene imine and 52.5 grams (0.520 mole) of triethylamine in 1000 ml. of 1,2-dimethyl ethylene glycol while maintaining a temperature of −5 to 0°. The reaction mixture was filtered to remove the triethylamine hydrochloride and the solvent was removed under reduced pressure without heating, to yield 252.7 grams of a solid residue. This was dissolved in chloroform and precipitated from this solution by the addition of benzene. The mixture was filtered to yield 139.4 grams (56.3% of theory) of white solid N-(11H-eicosafluoro-1-undecanoyl)-2,2-dimethyl ethylene imine, M.P. 64–72° C., nitrogen analysis: Calcd. 2.33; Found 2.08. An additional 20.2 grams (8.2%) M.P. 71–90° C., 2.27% N, was obtained by concentrating the filtrate and repeating the purification procedure.

EXAMPLE 19

Preparation of N,N'-bis(ethylene) hexafluoroglutaramide

A solution of 100.0 grams (0.362 mole) of perfluoroglutaryl chloride in 120 ml. of 1,2-dimethoxyethane (Ansul 121) was slowly added over a period of 90 minutes to a well stirred solution of 80.0 grams (0.80 mole) of triethylamine and 32.4 grams (0.754 mole) of ethylene imine in 400 ml. of Ansul 121. The temperature of the mixture was maintained at −11 to −14° C. during the addition by the use of an acetone-Dry Ice bath. The mixture was stirred for an hour at this temperature and then the temperature was allowed to rise slowly. At 18° C. the mixture became quite viscous. After an additional 7.3 grams of triethylamine was added, the mixture was chilled and filtered to remove the triethylamine hydrochloride and other solids. The filtrate was concentrated under reduced pressure to give 37.8 grams of sticky yellow residue (36.0% crude yield). The solids were dissolved in a mixture of water and ethyl acetate. The ethyl acetate phase was separated and the water was washed with four portions of ethyl acetate. The combined ethyl acetate extracts were dried over anhydrous sodium sulfate and concentrated under reduced pressure to give 27 grams of yellow viscous residue (additional 25.7% crude yield).

EXAMPLE 20

Preparation of perfluorooctanoyl chloride
$CF_3(CF_2)_6COCl$

A mixture of thionyl chloride (100.0 grams, 1.5 mole) and perfluorooctanoic acid (232.7 grams, 1.0 mole) was heated slowly to 75° over a period of four hours. The excess thionyl chloride was removed under reduced pressure and the residue distilled to yield 98.0 grams (40% of theory) of perfluorooctanoyl chloride, B.P. 129–131° at 74 mm. M. Hauptschein, J. F. O'Brien et al., J. Am. Chem. Soc., 75, 87 (1953)), hydrolyzable chlorine: Found: 8.2%; Calcd.: 8.2%.

EXAMPLE 21

Preparation of N-perfluorooctanoyl ethylene imine

Perfluorooctanoyl chloride (98.0 grams, 0.227 mole) dissolved in 125 ml. of 1,2-dimethoxy ethane (Ansul 121) was slowly added to a well stirred mixture of 12.7 grams (0.295 mole) of ethylene imine, 27.6 grams (0.273 mole) of triethylamine and 250 ml. of 1,2-dimethoxyethane during a period of two hours while maintaining a temperature of 0–10° C. The mixture was filtered to remove the triethylamine hydrochloride and the filtrate was concentrated in vacuo without heating to give 85.0 grams (85.3% yield) of crude product as a viscous liquid residue. Nitrogen analysis: Calculated for $C_{10}H_4F_{15}NO$ (percent): 3.19; Found (percent): 4.24. The high nitrogen content of this material was due to the presence of polymerized ethylene imine which could be removed only with difficulty.

EXAMPLE 22

The property of the fluoroaziridines to impart oil repellency to surfaces treated with them can be demonstrated for example, by treating cotton fabric with solutions containing the product of Example 17, drying and heating to achieve reaction. In the following experiment, a sample of bleached desized cotton fabric was impregnated on a laboratory padder with a solution containing 5% of the product of Example 17 in ethylene glycol dimethyl ether, dried on a pin-frame and cured in a forced draft oven for 2 minutes at 150° C. The oil repellency rating of the treated sample was 70 to 80 while an untreated sample had an oil repellency rating of zero. After 5 launderings in a washing machine, the oil repellency rating of the treated sample was unchanged, indicating that the fluoroaziridine had become permanently attached to the cellulose surface.

The utility of the fluorinated aziridines depends on their ability to react with and/or polymerize on polymeric surfaces, forming a surface of —$CF_2$— groups which has highly desirable oil repellent and water repellent properties. The effectiveness of the fluorinated surface is generally greater when the terminal group of the fluorinated radical is a —$CF_3$ group and the fluorinated chains are oriented perpendicularly to the polymer surface as shown schematically below (A)

(A) 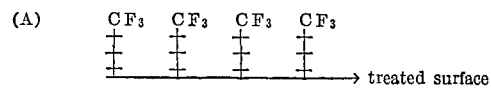
→ treated surface

However, it is also possible to achieve desirable surface properties when the —$CF_2$— elements of the fluorinated chain are oriented parallel to the polymer surface. In both instances, the aziridine radical provides the site for anchoring the fluorinated chain to the polymer by chemical bonding and/or by polymerization and film formation.

What is claimed is:
1. A compound of the formula:

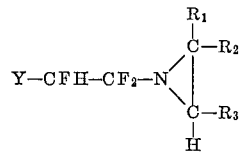

wherein Y is a polyfluoroalkyl containing from 2 to 12 carbon atoms, $R_1$ and $R_2$ are hydrogen and methyl and $R_3$ is hydrogen and lower alkyl.

2. A compound of the formula

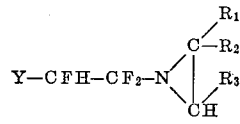

wherein Y is perfluoro-lower alkyl; $R_1$ and $R_2$ are selected from the group consisting of hydrogen and methyl; $R_3$ is selected from the group consisting of hydrogen and lower alkyl.

3. N-(2H,8H-pentadecafluoro-1-octyl) ethylene imine.
4. N-(2H-tetradecafluoroheptyl) ethylene imine.
5. 1,4-bis(1-aziridinyl)-2H,3H-hexafluorobutane.
6. The process for preparing a compound of the formula:

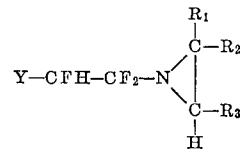

wherein Y is perfluoro-lower alkyl; $R_1$ and $R_2$ are selected from the group consisting of hydrogen and methyl; $R_3$ is selected from the group consisting of hydrogen and lower alkyl, which comprises contacting, in the liquid state, aziridine with a perfluoroolefin.

References Cited

UNITED STATES PATENTS

| | | | |
|---|---|---|---|
| 3,198,754 | 8/1965 | Ahlbrecht et al. | 260—239 |
| 2,830,045 | 4/1958 | Leumann et al. | 260—239 |
| 2,950,197 | 8/1960 | Allen et al. | 260—239 |
| 3,006,912 | 10/1961 | Vierling et al. | 260—239 |
| 3,038,776 | 6/1962 | Chance et al. | 260—239 |

OTHER REFERENCES

Lovelace et al., Aliphatic Fluorine Compounds (New York, 1958) pp. 220, 261–263 and 268–272.

ALTON D. ROLLINS, Primary Examiner

U.S. Cl. X.R.

8—116.2; 117—135.5; 260—348, 463, 486, 544, 601, 614, 615, 648, 653.3